(No Model.)

F. C. PETELER.
HEATER.

No. 446,008. Patented Feb. 10, 1891.

Witnesses.
S. M. Roberts.
J. Jenn

Inventor
Frank C. Peteler.
By Paul & Mumin Att'y's

THE NORRIS PETERS CO., PHOTO-LITHO., WASHINGTON, D. C.

UNITED STATES PATENT OFFICE.

FRANK C. PETELER, OF MINNEAPOLIS, MINNESOTA.

HEATER.

SPECIFICATION forming part of Letters Patent No. 446,008, dated February 10, 1891.

Application filed December 23, 1889. Serial No. 334,785. (No model.)

*To all whom it may concern:*

Be it known that I, FRANK C. PETELER, of Minneapolis, in the county of Hennepin and State of Minnesota, have invented certain new and useful Improvements in Heaters, of which the following is a specification.

My invention relates to improvements in heaters, designed particularly as a hot-air furnace, though capable of use in a stove or other heating apparatus; and the object of the invention is to utilize to the greatest extent the heat that is generally carried off in the smoke and other products of combustion, and also to provide means for heating to a high temperature a large volume of air that may be conducted from the heater to the rooms or apartments that it is desired to heat.

Figure 1:
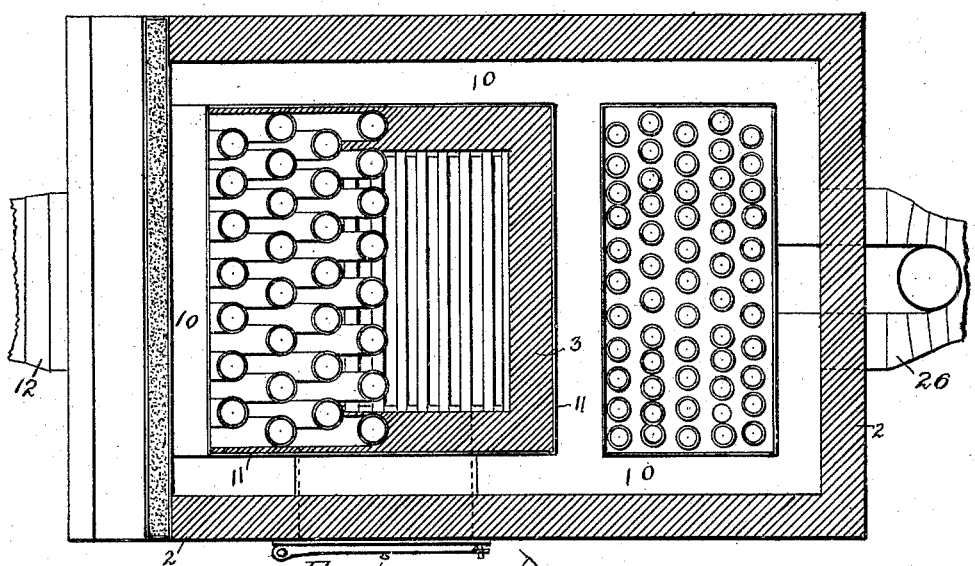
Figure 2:
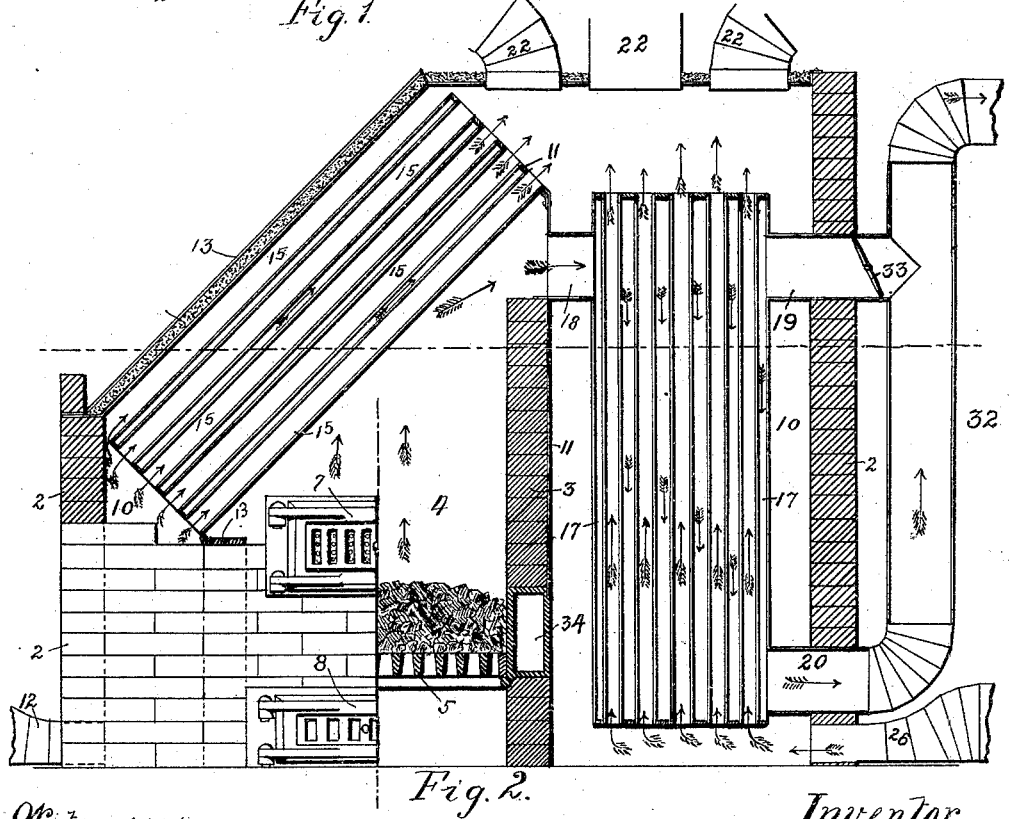

In the accompanying drawings, forming a part of this specification, Figure 1 is a horizontal section of the heater on line $x\ x$ of Fig. 2. Fig. 2 is a longitudinal vertical section of the heater with a portion of the front wall in elevation.

In the drawings, 2 represents the outer wall or casing, preferably formed of brick or other suitable material, and having a top wall 13, which may be provided with a layer of suitable non-conducting material. A fire-box or combustion-chamber 4, provided with a suitable grate 5, is arranged within the casing 2. The combustion-chamber is preferably inclosed by a suitable metallic casing 11, within which may be arranged a lining of fire-brick 3. This fire-brick lining may extend to any desired height in the combustion-chamber. I also preferably arrange the inclosing casing so that there is a space on all sides between it and the outer wall or casing 2. The space below the grate within the casing of the combustion-chamber forms an ash-pit, and suitable doors 7 and 8 are provided opening into the combustion-chamber and ash-pit. The space within the casing 2 and outside of the inclosing casing of the combustion-chamber forms an air-heating chamber 10. The top wall of the combustion-chamber 4 is preferably inclined, and the wall of the outer casing is also preferably similarly inclined above the combustion-chamber, as shown in Fig. 2. A series of inclined tubes 15 extends through the combustion-chamber in the upper part thereof, their lower ends being at one side of the combustion-chamber and their upper ends at the other. An air-inlet pipe 12 is arranged through the wall 2 at a point below the lower ends of the tubes 15, and this pipe brings a supply of fresh air into the lower part of the chamber 10 beneath said tubes 15. The combustion-chamber is also provided with a flue or pipe 18, leading out of the upper part thereof and arranged opposite the inclined tubes 15. This pipe connects with a drum 17, also arranged in the heating-chamber 10 and provided both at its upper and lower ends with pipes 19 and 20, leading into the smoke-stack 32. The pipe 19 is preferably provided with a damper 33, by means of which said pipe may be closed. An air-inlet pipe 26 also extends through the wall 2 at a point near the bottom of the drum 17. The drum 17 is provided with a series of vertical pipes 16, extending through said drum, as shown in Figs. 1. and 2. A series of pipes 22 is arranged at the upper part of the casing 2 for the purpose of leading the heated air from the chamber 10 to the rooms or apartments that it is desired to heat. The grate may be provided with an air-chamber 34, surrounding it and extending above it, as shown in Fig. 2.

The operation of the heater is as follows: The fire is built upon the grate in the usual way, and in starting the fire the damper 33 is opened, thus obtaining a direct draft through the pipes 18 and 19 into the smoke-pipe. The products of combustion rising from the fire pass around and among the pipes 15, being directed by the inclined top wall of the combustion-chamber and the inclined pipes toward the outlet-pipe 18. As the products of combustion enter the drum 17, if the damper 33 is closed, they pass downward through said drum 17, which forms a diving-flue, and out at the pipe 20 into the smoke-pipe. The air entering through the pipe 12 passes upward, and a part of it passes through the pipes 16, and part of it passes around the combustion-chamber and into the upper part of the chamber 10. The air that enters the lower part of the chamber 10 through the pipe 26 passes upward through the pipe 16 and around the drum 17, also into the upper part of the chamber 10. Both the outer surface of the casing 11 of the combustion-chamber and the outer surface of the drum 17 form radiating-surfaces, by means of which the air within the casing 2, that does not pass through the pipe, is also heated to a high temperature, and the air that passes through the pipes 15 and 16 is also raised to a very high temperature. The heated air from the chamber 10, passing through the pipes 22, is conducted to any rooms or apartments that it is desired to heat.

I claim as my invention—

1. A heater comprising, in combination, an outer wall or casing, an inner combustion-chamber whose walls constitute the inner wall of an air-chamber 10 between it and the outer casing, an exit-flue extending from the upper part of the combustion-chamber laterally into the air-space at one side of the combustion-chamber, a drum arranged in said air-space, with the upper portion of which said exit-flue communicates, a series of pipes extending vertically through said drum and open at both their upper and lower ends, a smoke-pipe 32, pipes 19 and 20, connecting the upper and lower portions of said drum with said smoke-flue, a damper in said upper pipe, an air-inlet pipe 26, extending through the outer casing at a point below the lower end of said drum, and pipes 22 for the heated air connected with the said air-space above the upper end of said drum, substantially as described.

2. In a heater, the combination, with the outer wall or casing 2, of the combustion-chamber located within said outer casing, with an air-space between the walls of said combustion-chamber and the walls of the casing, inclined air-pipes extending through the combustion-chamber from one side thereof to the other and communicating at both ends with said air-space, an air-inlet flue 12, connected with said air-space below the lower ends of said inclined tube, a drum arranged in said air-space at the side of said combustion-chamber and provided with a series of vertical pipes 16, communicating at both ends with said air-chamber, a smoke-pipe connecting said combustion-chamber with the upper portion of said drum, smoke-pipes connected with the upper and lower portions of said drum, a damper in the upper pipe, an air-inlet pipe connecting with said air-space below said drum, and air-conducting pipes 22, connected with said air-space above said drum and above the upper ends of said inclined tube, substantially as described.

In testimony whereof I have hereunto set my hand this 16th day of December, 1889.

FRANK C. PETELER.

In presence of—
A. C. PAUL,
S. W. ROBERTS.